MAGNETIC SHIELD FOR CATHODE-RAY APPARATUS

Filed Dec. 19, 1950 4 Sheets-Sheet 1

INVENTOR
Albert W. Friend
BY
[signature]
ATTORNEY

July 29, 1952 A. W. FRIEND 2,605,433

MAGNETIC SHIELD FOR CATHODE-RAY APPARATUS

Filed Dec. 19, 1950 4 Sheets-Sheet 2

INVENTOR
Albert W. Friend
BY
ATTORNEY

July 29, 1952 A. W. FRIEND 2,605,433

MAGNETIC SHIELD FOR CATHODE-RAY APPARATUS

Filed Dec. 19, 1950 4 Sheets-Sheet 3

INVENTOR
Albert W. Friend
BY
[signature]
ATTORNEY

MAGNETIC SHIELD FOR CATHODE-RAY APPARATUS

Filed Dec. 19, 1950 4 Sheets-Sheet 4

INVENTOR
Albert W. Friend
BY
[signature]
ATTORNEY

Patented July 29, 1952 2,605,433

UNITED STATES PATENT OFFICE 2,605,433

MAGNETIC SHIELD FOR CATHODE-RAY APPARATUS

Albert W. Friend, Princeton, N. J., assignor to Radio Corporation of America, a corporation of Delaware Application December 19, 1950, Serial No. 201,618

7 Claims. (Cl. 313—76)

This invention relates to magnetic shields for television deflection yokes and more particularly to shields for preventing adverse effects caused by the end loops of deflection coils.

Many electrical applications require a magnetic field to be produced by a coil or group of coils which is of substantially uniform value throughout the cross sectional area included within the coils. Particularly is this true in coils used in electronic equipment for causing deflection of a cathode ray beam. Undesired magnetic field gradients appear at the ends of the coils and result in distorting the beam focus and in nonuniform deflection.

For the purposes of simplicity in explanation, the invention will be described as applied to the deflection yoke of a cathode ray picture tube as used in television apparatus. It will be clear, however, that the invention is equally applicable to coils for use in other apparatus using cathode ray beam deflecting coils.

It is an object of this invention to provide a magnetic shield which will prevent the introduction of magnetic field gradients caused by the end loops of coils.

It is a further object of this invention to provide an arrangement of the type under consideration whereby the shielding effect may be simply and easily varied.

More particularly it is an object of the invention to provide an improved magnetic end shield for the deflection yokes of television apparatus.

Briefly, in accordance with the invention, there is provided an end member of magnetic material shaped to fit closely the ends of the coils. The end member may be in the shape of a truncated cone, slotted or unslotted or may consist of a supporting ring carrying magnetic members which may be adjustable radially or circumferentially to provide the desired degree of shielding.

The above and other objects of the invention will become apparent upon a consideration of the following detailed description taken in conjunction with the accompanying drawings in which.

Figures 1, 2, 3, 4:
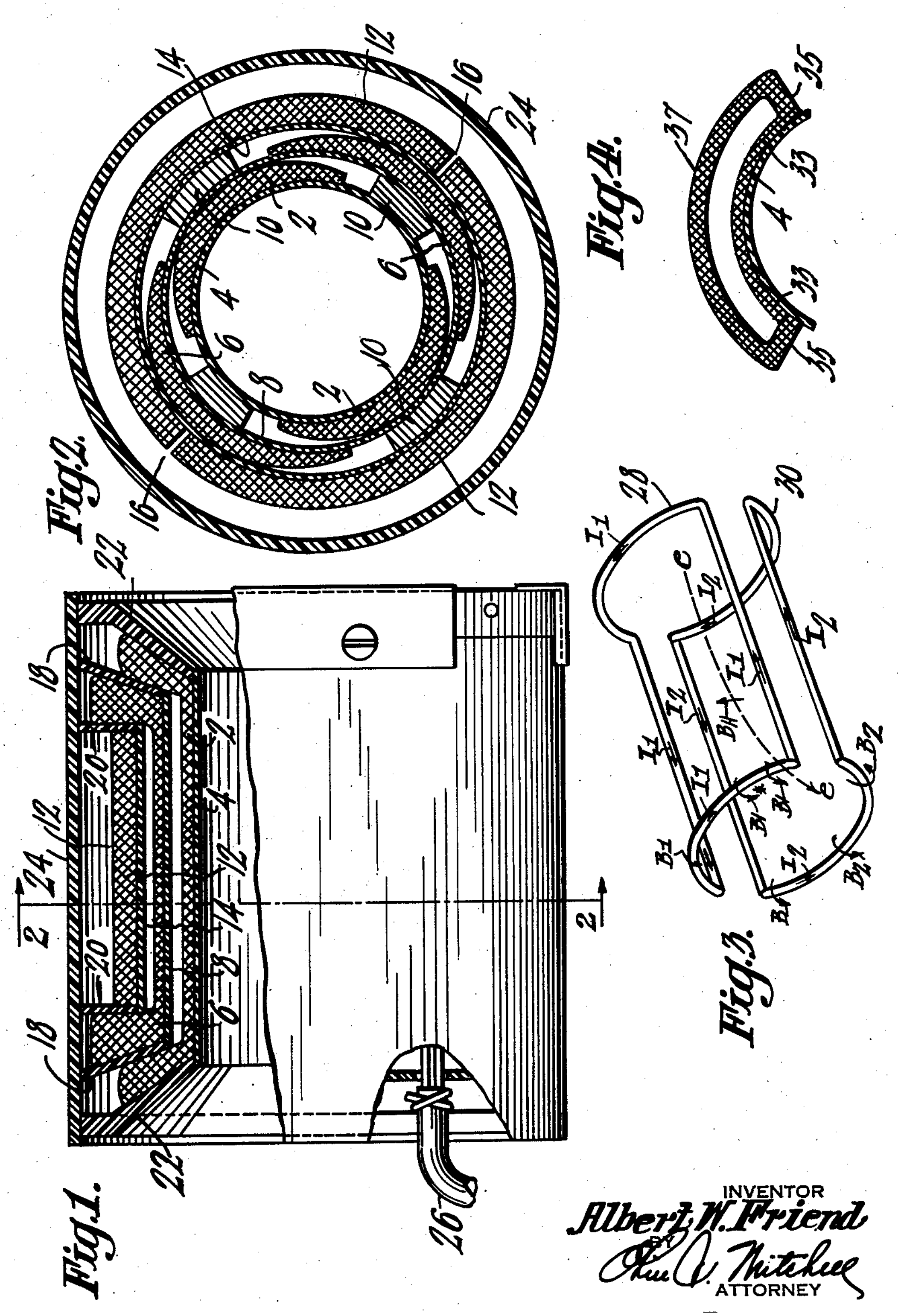
Fig. 1 is a side view, partly in cross-section of the usual form of deflecting yoke.
Fig. 2 is a sectional view of the arrangement of Fig. 1 taken on the line 2—2.
Fig. 3 is a simplified sketch of the deflection coil windings.
Fig. 4 is an end view of a modified deflection coil.

Referring to Figs. 1 and 2 there has been shown a typical deflection yoke for use with a television receiver kinescope. The horizontal deflecting coils 2 are wound transversely on an inner insulating shell 4. The vertical deflecting coils 6 are wound transversely on supporting shell 8 separated from the inner shell by filler pieces 10. An iron core 12, preferably of ferrite, is supported on the separating shell 14. The core is made in two halves and has small gaps 16. The ends of the coils are provided with separating members 18 and 20 and end members 22. The entire assembly is enclosed by an outside shell 24. The electrical leads are brought out through cable 26. This type of deflection yoke is standard practice and has been shown here merely to aid in the understanding of the invention.

While the distortion of the beam focus caused by the end loops of the deflection windings is objectional in conventional black and white television receivers using a single cathode ray beam and may be substantially obviated by means of the invention, this factor is less noticeable than the effect of non-uniform deflection resulting from the end loop effect when using a multielement screen for color television wherein the particular color phosphor energized is dependent upon the angle at which the beam is directed to the screen. This latter factor is present whether the system uses three separate beams having different angles of approach or a single beam whose angle of approach is cyclically varied. For simplicity in explanation, however, the description of the invention will be as the invention is applied to a three-beam tri-color television system. Such a system is shown in Fig. 13.

Figure 13:
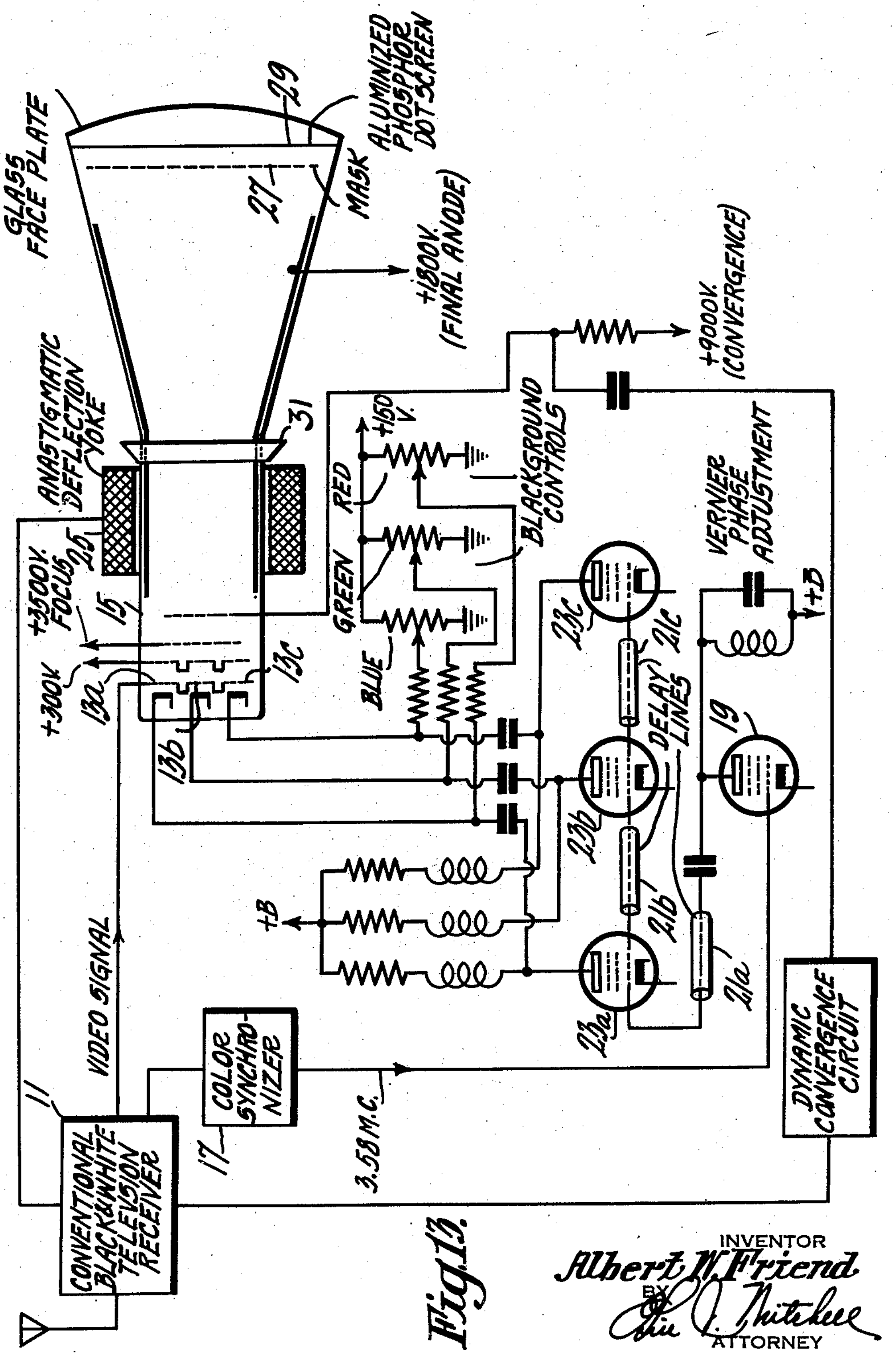
Fig. 13 is a schematic representation of a television system employing an embodiment of the invention.

Referring to Fig. 13 there is shown in block diagram a receiver arrangement utilizing a three-gun tri-color kinescope. Video signals from a conventional black and white television receiver 11, are applied simultaneously to the three control grids 13a, 13b and 13c of the three-gun kinescope 15. Another signal, derived from the video amplifier, is used to actuate an automatic color phasing and sampling synchronization circuit 17 which produces a 3.58 mc. sampling wave. The latter is applied through an amplifier tube 19 and appropriate delay lines 21a, 21b and 21c, to three gating tubes 23a, 23b and 23c which supply three sampling pulses, differing in phase by 120 degrees at 3.58 mc., to the three cathodes of the kinescope. Thus, each gun is turned on in time sequence corresponding to the original sampling process at the transmitter and the beam current from each gun excites only one of the three phosphor colors. The deflection circuitry is of the conventional type utilizing an anastigmatic yoke 25. The kinescope is of the type utilizing an apertured mask 27 interposed between the guns and a dot phosphor screen 29. A color receiver of this type is well known and a full description of the operation thereof is not believed necessary. However, for those who are interested in a more complete description reference may be had to RCS Bulletins on Color Television and UHF, October 1949 to July 1950, Radio Corporation of America, July 1950.

In accordance with the invention, a magnetic shield 31 is placed adjacent one end of the deflection yoke 25 of the tri-color kinescope. The functioning of this shield will be explained below.

It has been found that when the deflection produced by yokes, which may have been designed specifically for multi-beam deflection, is sufficient to cause one or more of the beams to pass near to the actual conductors of the windings, distorting deflections are produced in the relative beam positions. This is caused by the large values of magnetic field gradient in the vicinity of the conductors, which cause somewhat different deflection effects to act upon each of the different beams. Furthermore, the direction of current flow, in space, is radically different at the various positions around the ends of the yoke windings, due to the peculiar shape of the windings.

In order to aid in the understanding of this problem there has been shown in Fig. 3 a simplified sketch of one set of deflection windings. Referring to that figure, it will be seen that the magnetic flux density $B_1$, from the end of coil 28 enters the yoke to yield an entering axial flux on the left (front) end while the flux $B_2$ of coil 30 leaves the inside of the yoke space on the same end. The flux density $B_H$ inside the windings, which is caused by both windings is directed upwardly as indicated in the figure so that the path of a deflected beam of electrons is approximately as shown by the dashed trace *e—e*, which curves to the right side of the front opening of the yoke in moving forward.

The electron beam enters from the rear of the yoke near the central axis and travels along a curved path in an essentially symmetrical and constant field until it approaches the forward end of the yoke, where it may pass very close to one of the bundles of conductors of the coils 28 and 30, where they pass around the neck of the tube, near the cone of the tube envelope at the "reference line" where the neck joins the cone.

The magnetic field intensity (B) at a radial distance (r) from a long straight conductor which carries a current (I), is:

$$B=\frac{0.2I}{r}=\frac{I}{5r}$$

This is also approximately true for points near the bundles of turns in the end loops of a deflection yoke provided one utilizes a summation of the effects of the (n) turns so that:

$$B_1=\frac{I}{5}\sum_{a=l}^{a=n}\left(\frac{1}{r_a}\right)$$
$$=\frac{I}{5}\left(\frac{1}{r_1}+\frac{1}{r_2}+\frac{1}{r_3}+1\ .\ .\ .\ \frac{1}{r_n}\right)$$

The deflection of the electron beam is in general produced by the combined magnetic action of two sets of coils (horizontal and vertical deflection windings), so that inside the yoke there is also a field intensity $B_{V1}$ which must be added across the yoke at right angles to the field intensity $B_H$ shown in Fig. 3. When current is passed in a certain combination of directions through both the horizontal and vertical sets of windings, the electron beam may be so deflected that it passes near to the bundle of conductors 28 in the region marked by an asterisk. The deviations in the magnetic fields near the periphery, at the front edge of the yoke, therefore cause serious color-raster mis-registrations near the picture edges. This mis-registration varies somewhat around the periphery, because of the displacements between the horizontal and vertical windings, but the effects are substantially symmetrical across a diameter of the picture, if non-symmetries of construction and adjustment are eliminated.

In addition to the magnetic fields indicated in Fig. 3, there are also other differently oriented field paths around the conductors in the regions where they bend from the straight axially directed sections to the curved sections. There are radial current components in these portions of the windings, and these components produce additional discrepancies from the desired magnetic field.

One way in which the deleterious effect of the end loops may be reduced is by bending the ends of the yoke coils up and away from the neck of the tube as abruptly as possible. Referring to Fig. 4, there is shown an end view of a single horizontal deflecting coil 2 constructed in accordance with that conception. A similar construction would be used with the other coils of the deflection yoke. On the inner shell 4 the straight sides 33 of the coil lie in a plane perpendicular to the plane of the drawing. The end turns are bent up as sharply as possible at points 35 at right angles to the sides of the coil and in a radial direction. The end turns may extend out a radial distance equal to at least three-eighths of the radius of the inside diameter of the yoke. The cross over 37 of the end turns is in an arcuate path substantially coaxial with the axis of the yoke. The front end turns only may be so wound or both the front and rear end turns can be given this configuration. By so constructing the coils, the end loops are placed a sufficient distance from the beam path that the end turn effect is lessened.

However, in order to minimize still further the effect on the cathode ray beam of the undesired fields noted above, it is desirable, in accordance with the invention, to provide magnetic shielding means for preventing the establishment of large magnetic field gradients near the ends of the deflection coils in the regions where the electron beams may pass. At the same time it is desirable to prevent any appreciable shunting of the magnetomotive force produced by the yoke windings. In accordance with the invention, this may be accomplished by placing a magnetic shield 31 adjacent the front end of the coils as shown in Fig. 13.

Figure 5:
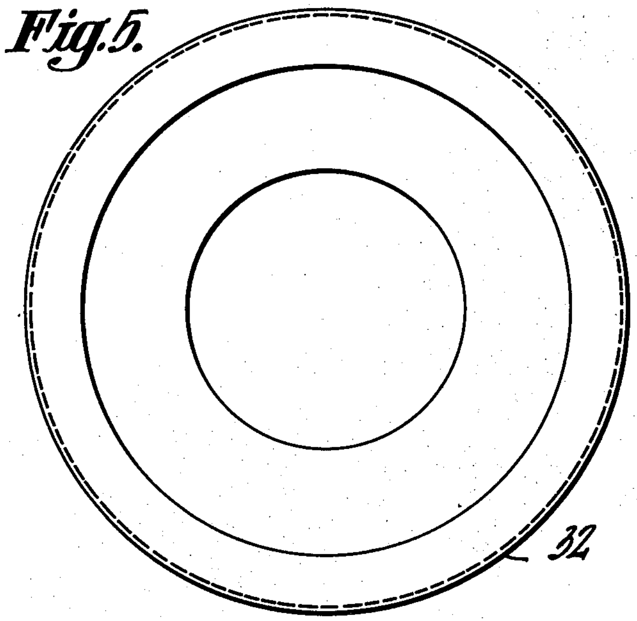
Fig. 5 is an end view of one type of end shield constructed in accordance with the invention.
Figure 6:
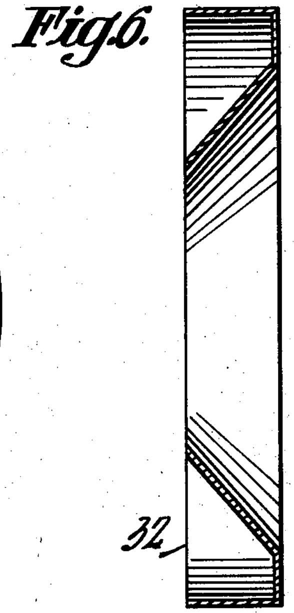
Fig. 6 is a cross-section along a center line of the shield shown in Fig. 4.

One form of a suitable magnetic shielding element is shown in Figs. 5 and 6. Here, the element comprises a thin conical shield 32 of a ferromagnetic material such as an alloy of nickel and iron, of iron and silicon, or of one of the ferrite materials. This shield is formed to fit over the end member 22 of the front of the yoke and thus lies closely adjacent to the end loops of the coils. Such a shield is not entirely satisfactory since it is not easily adjustable and the magnetic shunting of the deflection field is somewhat higher than desirable.

Figure 7:
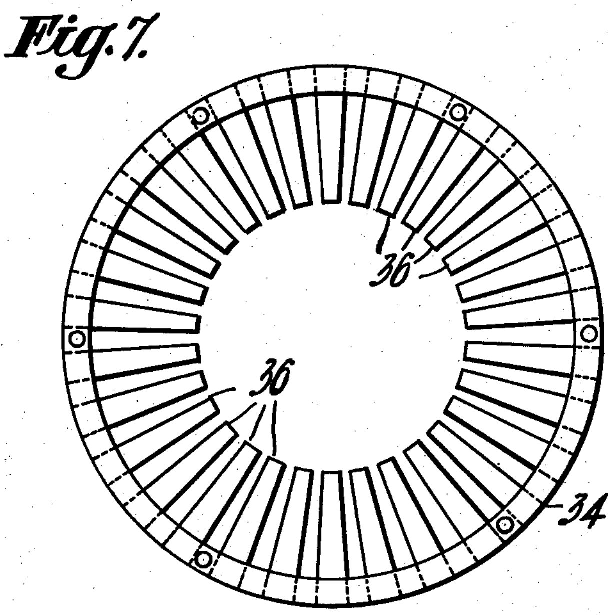
Fig. 7 is an end view of a modified form of the shield of Fig. 4.
Figure 8:
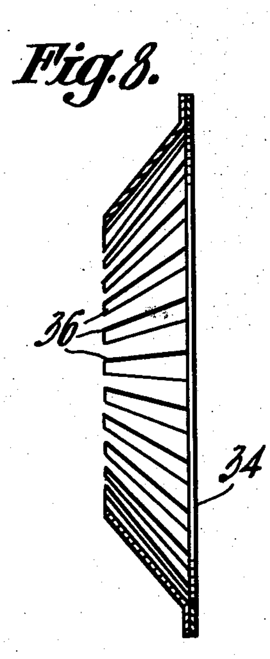
Fig. 8 is a cross-section along a center line of the shield shown in Fig. 6.
Figure 10:
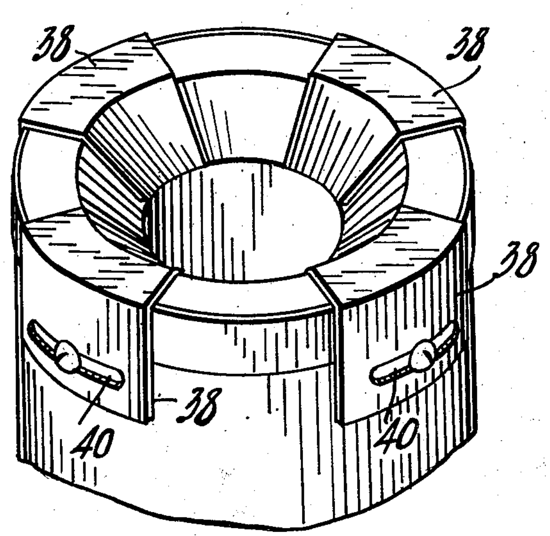
Fig. 10 shows an arrangement applying the elements of Fig. 8 to a deflection yoke.

The conical shield may be improved by the slotted shield arrangement 34 shown in Figs. 7 and 8. Here the cone of the shield has been formed by a plurality of fingers 36 of magnetic material. Adjustment may be had by bending the fingers or varying their lengths while the shielding effect is reduced by the spaces therebetween. With such a construction two shields may be used with overlapping shield fingers to obtain the desired degree of shielding.

Figure 9:
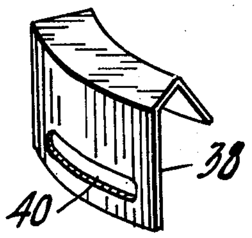
Fig. 9 represents a shielding element constructed in accordance with the invention.

The shield may be composed of separate conical segments 38 such as shown in Fig. 9. These parts are of similar cross-section to the conical shield of Figs. 5 and 6 and represent segments cut along radial lines. They are fastened to the yoke as shown in Fig. 9, the slots 40 in the edges of the segments allowing for adjustment. It will be noted that the segments are more widely spaced about the yokes at points corresponding to the top and bottom of the picture since these points are of minimum deflection angle. The gaps about the periphery of the yoke aid in reducing the magnetic shunting effect between the opposite sides of the yoke. The desired shunting direction is largely radial.

Figures 11, 12:
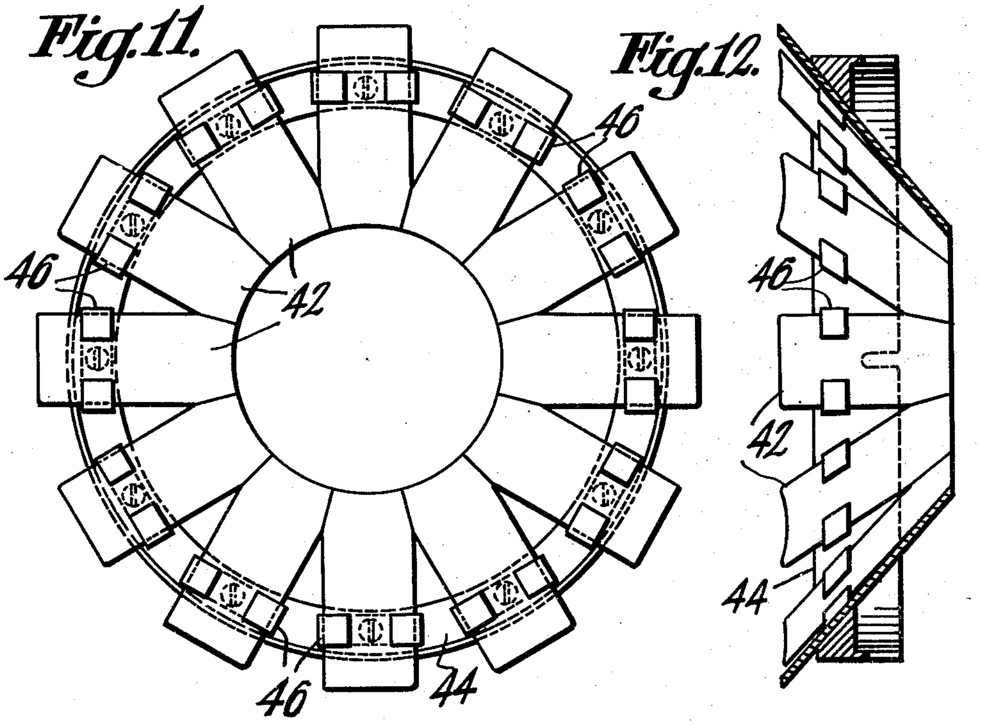
Fig. 11 is an end view of a shield constructed in accordance with the invention.
Fig. 12 is a side view of the arrangement shown in Fig. 10.

An arrangement providing greater ease of adjustment is shown in Figs. 11 and 12. Here a plurality of magnetic fingers 42 is held in place on a supporting ring 44 by means of spring clips 46. The fingers are directed inwardly at an angle and are shaped at their inside ends to form a solid cone shaped body when the fingers are inserted entirely within the ring. They may be easily adjusted by sliding the fingers through the spring clips. The clips may be made wide enough so that in addition to radial adjustment, it is also possible to vary the angle at which they extend into the center to other than normal to the circumference of the support 44 to obtain a desired shielding pattern.

What is claimed is:

1. In a color television system the combination of a cathode ray tube having a tri-color phosphor screen of the type in which the color emitted upon energization by a cathode ray beam is dependent upon the angle of approach of said beam, and means generating a cathode ray beam, magnetic deflecting means associated with said tube arranged to cause said beam to scan said screen, said deflecting means including deflection coils having end turns, means causing said cathode ray beam to approach said screen at different angles and a magnetic shielding device positioned adjacent one end of said deflecting coils so as to shield said beam from the magnetic flux produced by the end turns of said coils adjacent said shielding device whereby the deflection of said beam is made independent of its angle of approach to said screen and color registration is maintained.

2. In a color television system the combination of a cathode ray tube having a tri-color phosphor screen of the type in which the color emitted upon energization by a cathode ray beam is dependent upon the angle of approach of said beam, and means generating a plurality of cathode ray beams, magnetic deflecting means associated with said tube arranged to cause said beams to scan said screen, said deflecting means including deflection coils having end turns, means causing said cathode ray beams to approach said screen at different angles and a magnetic shielding device positioned adjacent one end of said deflecting coils so as to shield said beams from the magnetic flux produced by the end turns of said coils adjacent said shielding device whereby the deflection of said beams is made independent of their angle of approach to said screen and color registration is maintained.

3. In combination, a cathode ray deflection yoke including coils having end turns and a plurality of magnetic members formed in the shape of radial segments of a cone inserted in one end of said yoke.

4. In combination, a cathode ray deflection yoke including coils having end turns and a plurality of magnetic members adjustably positioned within one end of said yoke.

5. The combination of claim 4 in which said members are adjustably positioned about the periphery of said yoke.

6. The combination of claim 4 in which the depth to which said members extend into said yoke is adjustable.

7. A magnetic shield comprising in combination, a ring-shaped support, a plurality of spring clips on the periphery of said support, and a plurality of magnetic members extending radially into the center area of said support, said members being slideably held by said clips whereby the degree of extension of said members into said center area may be varied.

ALBERT W. FRIEND.

REFERENCES CITED

The following references are of record in the file of this patent:

UNITED STATES PATENTS

| Number | Name | Date |
|---|---|---|
| 2,167,379 | Tolson | July 25, 1939 |
| 2,228,821 | Hansen | Jan. 14, 1941 |
| 2,234,038 | Bedford | Mar. 4, 1941 |
| 2,565,331 | Torsch | Aug. 21, 1951 |

OTHER REFERENCES

Abstract of application Serial No. 84,272, Electromagnetic Yoke Shield. Gustave L. Grundman, Westmont, N. J., and Gustav Bergson, Philadelphia, Pa. Filed March 30, 1939, published July 17, 1951. (Published on July 17, 1951 in 648 O. G. 949). 1 sheet drawings, 11 pages spec.